Jan. 5, 1943.  E. G. HINES ET AL  2,307,129
SHOCKPROOF GEAR
Filed April 5, 1940
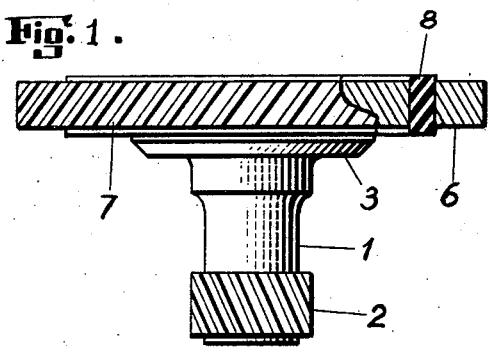
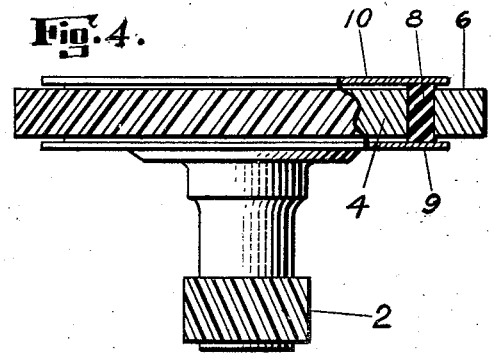
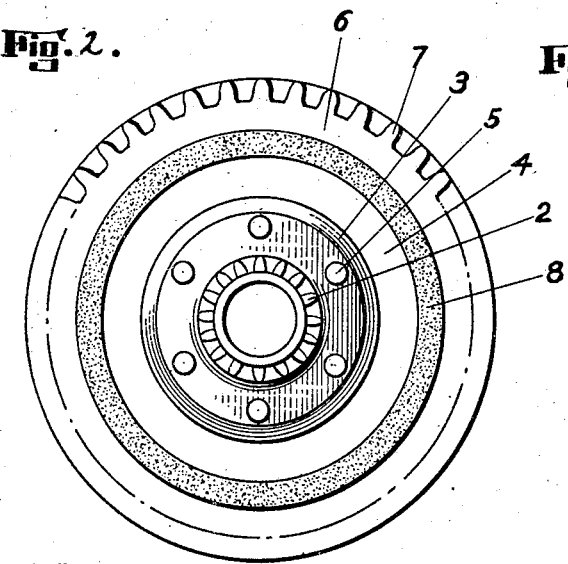
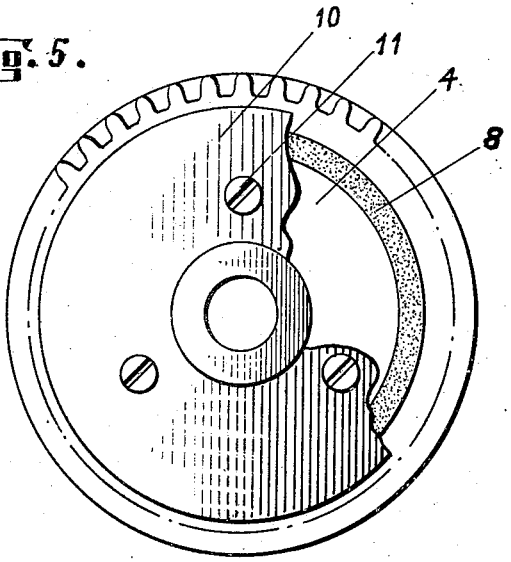
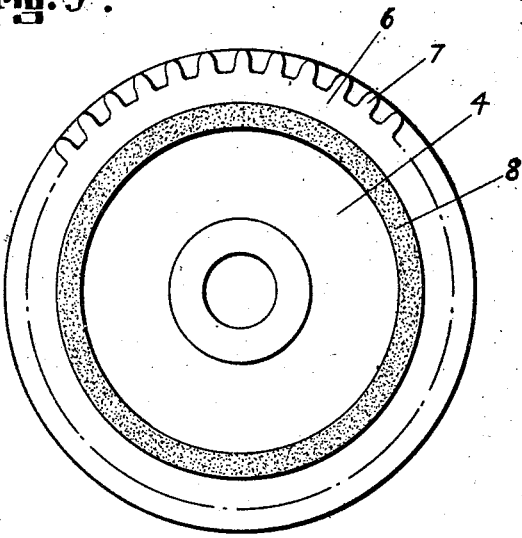
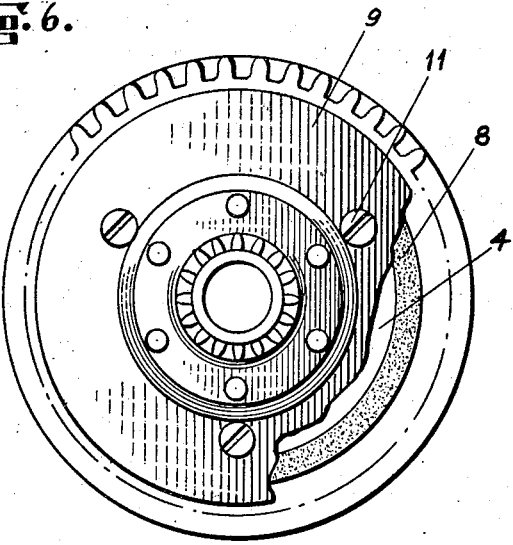
INVENTOR
EARLE G. HINES
BY EDMUND BARANY
Hastings W. Baker
their atty.

Patented Jan. 5, 1943

2,307,129

UNITED STATES PATENT OFFICE 2,307,129

SHOCKPROOF GEAR

Earle G. Hines, West Milford, N. J., and Edmund Barany, New York, N. Y., assignors to International Projector Corporation, New York, N. Y., a corporation of Delaware Application April 5, 1940, Serial No. 327,966

6 Claims. (Cl. 64—27)

The object of this invention is to eliminate shock and noises in gears and relates more particularly to a gear in which a resilient material or composition is inserted in the body of the gear between the part of the gear carrying the gear teeth and the hub thereof. For instance in a spur gear the teeth would be carried by a ring which would be intimately bonded to a resilient ring which would in turn be bonded to the part of the gear extending to the hub.

The composite gear blank would therefore consist of two or more dissimilar materials, one cf which is a rubber-like ring interposed between the outer or teeth carrying portion of the gear and the inner portion thereof, the rubber-like material being intimately bonded to the inner and the outer portions of the gear.

Many advantages are secured by such an arrangement, among which might be mentioned the following:

1. Noise transmission through a train of gears is stopped at whatever point the shockproof gear is used.

2. Destructive vibrations either within, above or below the audible range are dampened and well-nigh eliminated.

3. Directional stresses and strains and resulting distortions in aligned moving parts are corrected, thus compensating for gear shift or misalignment as in the case of two shafts slightly skewed in relation to each other.

4. Manufacturing limits can be larger than would otherwise be required. Especially is this true when there are errors in gear tooth spacing or where the gear is slightly oversized, for all of such errors are compensated for because the resilient section of the gear blank furnishes what amounts to a variable pitch line. The resilient material also compensates for any eccentricity in the gear and for normal variations in the gear center distance in mating gears which might be caused by machining errors in the location of holes or shafts in which the gears are mounted or an error in the exact size of the gear itself. This gear would also compensate for errors produced after machining from such operations as heat treating or by bending and would compensate for warpage or distortion caused by varying atmospheric conditions and this is especially true where molded materials such as laminated materials having a linen or a canvas base is employed. It will also be apparent that when such a gear is employed the tedious and selective fitting of mating gears is unnecessary.

5. Such a gear furnishes an insulating medium in the cases where it is desirable to separate the gear and the shaft electrically.

6. Shock loads are eliminated or cushioned so that the shock is not transmitted to mating gears and other portions of the mechanism which is particularly valuable in affording protection to delicate shafts and bearings. This cushioning effect under variable loads is of particular importance. As a matter of fact, such a gear acts as a safety valve in mechanisms for if serious interference is encountered the resilient material will yield, thereby absorbing the abnormal shock, unless it is so great as to cause the gear teeth themselves to yield, in which case it would be necessary to replace the gear.

7. By eliminating or deadening the noise, the gear will have longer life for wherever we have noise we have wear, and wear always results in a loss of efficiency. Such a gear eliminates vibration or at least greatly deadens it. Such noises are particularly objectionable to many industries such as in moving picture projectors and sound apparatus therefor. In any industry the elimination of the noise not only means a longer life for the machine in which the gear is employed, but these noises are also injurious to the operators. It is well known that a man works with better efficiency when the machine is silent than would be the case when the machine is noisy.

8. Such a gear permits a tight fit between intermeshing gears, free from backlash in the gearing and eliminates excessive friction or binding in operation.

Other objects and advantages will appear in the detailed specification and drawing in which the invention is shown by way of illustration only as applied to a motion picture projector but it should be realized that its applicability is not limited to motion picture projectors but that it has a wide application and may be used wherever gearing is employed.

In the drawings,

Fig. 1 is a top plan view partly in cross-section of such a gear without supporting disks.

Fig. 2 is a face view of the gears shown in Fig. 1 and looking from the bottom of the structure shown in Fig. 1 upwardly.

Fig. 3 is a face view of the opposite side of the gear shown in Fig. 1.

Fig. 4 is a plan view of the gear partly in cross-section but provided with supporting disks on each side of the gear.

Fig. 5 is a top face view of the gear shown in Fig. 4 and

Fig. 6 is a bottom face view of the gear shown in Fig. 4.

In Figs. 5 and 6 a part of the disk is broken away.

Referring to Figs. 1, 2, and 3 a metallic hub 1 provided with a pinion 2 is secured to or is integral with a flange 3. The flange 3 is secured to a body 4 forming the inner or hub portion of the gear. An outer ring 6 carrying the gear teeth 7 is bonded to a rubber-like insert 8 which is also bonded to the body 4. The body 4 and the ring 6 may be made of metal or made of a fabric composition. A number of such compositions are on the market. One of these is sold under the trade name "Celeron." Most of these compositions consist of a number of sheets of linen or canvas and are usually bonded together by resinous materials under considerable heat and pressure. The rubber-like insert 8 may be any resilient material which is found to be suitable. Rubber itself may be employed but is objectionable in that oil will attack the same. We prefer to employ one of the well-known substances such as Thiokol, Duprene, neoprene and other like substances which are not attacked by oil. We have found that Thiokol is an excellent material to use for the rubber-like insert, especially when a fabric composition such as Celeron is employed for the remainder of the gear, whereas, we find that neoprene makes a better bond if a metallic gear is employed. In any case, however, the rubber-like insert is bonded to both the outer ring 6 and the inner body 4. As a matter of fact, we find that this bond is so strong that it will not be disrupted or torn apart at the point of bonding for this bonding seems to be much stronger than the remaining portions of the gear.

The construction shown in Figs. 4, 5 and 6 is identical with that heretofore described except that disks 9 and 10 are provided on each side of the gear, which disks may be secured to the body 4 by means of screws 11. In Fig. 5 we have shown disks on either side of the gear and the purpose of these disks is to hinder and limit the lateral movement of the ring 6 relatively to body 4. In worm gearing there would be a natural tendency for the ring to move laterally in the direction of the thrust and this movement would be to one side of the body 4. The disk 10 would prevent the ring 6 from moving laterally more than a very short distance away from the pinion 2 while the disk 9 would prevent other than a very small movement of the ring toward the pinion 2. Generally such gears will be driven in one direction and in this case the two disks are not necessary for one of them would never perform any function. Therefore, in gears that will only be driven in one direction or gears which will drive in only one direction only one disk is necessary. While we have shown these disks as completely covering the rubber-like insert 8, disks of a smaller radius may be employed so as only partly to cover the rubber-like insert so as to permit more of a lateral movement of the ring 6 relative to the body 4.

In Fig. 4 it will be noted that the rubber-like insert 8 extends for a short distance on each side of the central body 4 and the ring 6 and that the disks 9 and 10 are, therefore, held slightly spaced from the ring 6. This allows the ring 6 to move laterally a short distance but this movement is hindered and definitely limited by the disk towards which the ring moves. If, therefore, the ring 6 is driving the pinion 2 and if the load suddenly increases the ring 6 would simply move towards one of the disks but this movement would be definitely limited by the disk.

We realize that many changes may be made in the specific form of the invention shown by way of illustration herein without departing from the spirit of this invention and we, therefore, desire to claim the same broadly except as we may limit ourselves in the appended claims.

Having now described our invention, we claim:

1. A gear consisting of a central body, an outer toothed ring spaced from the central body, the side walls of the ring and body lying in the same plane, a sound absorbing mass filling the space between the central body and the outer toothed ring and bonded to each of them and a disk lying adjacent to the outer ring to limit the distance the outer ring can move laterally of the central body.

2. A gear consisting of a central body, an outer toothed ring spaced from the central body, the side walls of the ring and body lying in the same plane, a resilient mass filling the space between the central body and the outer toothed ring and bonded to each of them and a disk secured to the central body and lying adjacent to the outer ring to limit the distance the outer ring can move laterally of the central body.

3. A gear consisting of a central body, an outer toothed ring spaced from the central body, the side walls of the ring and body lying in the same plane, a shock absorbing mass interposed between the central body and the outer toothed ring and filling the space therebetween, said mass being bonded to the central body and the outer toothed ring and a flat circular disk secured to the central body and lying adjacent to the outer ring to limit the distance the outer ring can move laterally relative to the central body.

4. A gear consisting of a central body, an outer toothed ring spaced from the central body, the opposite side walls of the body and ring lying in the same planes respectively, a resilient mass interposed between the central body and the outer toothed ring and filling the space therebetween, said resilient mass being bonded to the central body and the outer toothed ring and flat circular disks on each side of the gear and secured thereto, said disks lying adjacent to the outer ring to limit the distance the outer ring can move laterally relative to the central body.

5. A gear consisting of a central body, an outer toothed ring spaced from the central body, the side walls of the ring and body lying in the same plane, a resilient mass bonded to the central body and the outer toothed ring and filling the space therebetween, said resilient mass protruding beyond one of the side walls of the ring and a disk secured to the gear and extending over and in contact with the protruding surface of the resilient mass and lying closely adjacent to the said plane but being spaced therefrom by a distance equal to the amount the resilient mass protrudes, said disk serving as a means to limit the distance the outer ring can move laterally of the central body.

6. A gear consisting of a central body, an outer toothed ring spaced from the central body, said body and ring having a lateral face lying in the same plane, a resilient mass interposed between the ring and body and bonded to each of them, said resilient mass protruding outwardly beyond said plane and a disk secured to said gear and overlying the protruding portion of the resilient mass, said disk having a radial surface overlapping the inner portion of said ring and being spaced from said ring by a distance substantially equal to the distance that the rubber-like mass protrudes beyond said plane, the outer toothed ring being non-resonant material.

EARLE G. HINES.
EDMUND BARANY.